March 21, 1939.   F. A. WILLIAMS   2,150,955
INTERNAL COMBUSTION ENGINE
Original Filed Aug. 20, 1925   7 Sheets-Sheet 1

INVENTOR.
Frank Abner Williams
BY Whittemore Hulbert Whittemore
Belknap
ATTORNEYS

March 21, 1939. F. A. WILLIAMS 2,150,955
INTERNAL COMBUSTION ENGINE
Original Filed Aug. 20, 1925  7 Sheets-Sheet 2

Inventor
Frank Abner Williams
By Whittemore Hulbert Whittemore
 & Belknap   Attorneys

March 21, 1939. F. A. WILLIAMS 2,150,955
INTERNAL COMBUSTION ENGINE
Original Filed Aug. 20, 1925 7 Sheets-Sheet 4

Inventor
Frank Abner Williams

By Whittemore Hulbert Whittemore
Belknap Attorneys

March 21, 1939.  F. A. WILLIAMS  2,150,955
INTERNAL COMBUSTION ENGINE
Original Filed Aug. 20, 1925  7 Sheets-Sheet 5

Inventor
Frank Abner Williams
By Whittemore Hulbert Whittemore
& Belknap  Attorneys Patented Mar. 21, 1939

2,150,955

UNITED STATES PATENT OFFICE 2,150,955

INTERNAL COMBUSTION ENGINE

Frank Abner Williams, Detroit, Mich.

Application August 20, 1925, Serial No. 51,503
Renewed October 15, 1930

98 Claims. (Cl. 123—81)

This invention relates to engines and refers more particularly to an operating mechanism for the valves.

One of the objects of my invention is to provide a sleeve valve operating mechanism which is simple in operation and is compactly arranged with respect to the engine cylinders and crankcase.

A further feature of my invention resides in combination with an engine which may be of the internal combustion type controlled by single sleeve valves any point of which moves in a smooth closed curve of an operating mechanism for the sleeve valves having connection therewith wholly or partly within the extension of the cylinders, and wholly or partly within the sleeve valves or their extensions.

The drawings and specification show an internal combustion engine of unique design, including a direct acting single-sleeve valve-operating mechanism. Valve ports of suitable construction and required arrangement are shown.

A novel type of compact bearing is used to support the sleeve driving member. Special structural features of the crank-case and cylinder block are shown in conjunction with the supporting members for the operating parts. The entire compact mechanism is attained by several novel clearances of unusual construction.

My invention more generally contemplates the operation of two adjacent sleeve-valves by a common rotary member between the adjacent cylinders, and also between their axes at the bottom of the cylinders, and a separate connection in different angular phase, one on each side of said rotary member to its adjacent sleeve valve; said connection extending within the valve's inner wall or bore including its projection.

In order to produce an efficient valve mechanism, a compact and more direct acting device was designed to operate the single sleeve valve through a connection closer than usual to its axis, said connection being from a driving member between the cylinders' axes. The sleeve valve driving gear bearing housing is annular in form and may have clearances for the cylinders when they extend that low (and which may be several in a block), and is attached to the crank case. The gear bearing housing also has a clearance for the lay-shaft gear and is ribbed to the crank shaft bearing housing and to the crank case walls directly, and on one side to the lay-shaft adjacent annular bearing housing which is also ribbed to the wall of the crank case. The lay-shaft bearing housing and sleeve driving gear bearing housing and their ribs form an integral bridge across the crank case walls between a pair of adjacent cylinders whose sleeves are operated by the common rotary member which is preferably a gear directly driven by another gear preferably on the lay-shaft. This design, which moves any point on the valve wall through a smooth, closed curve, with the best location for the valve connection, that is within the bore, produces more circumferential than axial displacement. The sleeve-valve has ports to co-act with those of the cylinder for passage of the gases in proper sequence. Generally the intake and exhaust ports of the cylinder, in a four cycle engine, are of different contours from each other and paths of adjacent like ports of a sleeve intersect each other. The shape and size of a port and its location from another similar port (as inlet, for example) is conditionally determined by the shape and size of the path of a moving point on the sleeve. The same is true of the exhaust ports which are also conditionally determined in shape, size and location apart by the closed path of the moving point.

The nature, shape and size of the ports is conditionally determined by the motion of the said valve, but the best ports, that is, of maximum area, are entirely determined by the motion of said valve.

As a point on the contour of the valve's intake port describes its path, said intake port must start to open with a similar port in the cylinder wall, as the said tracing point passes over approximately the position where at that time the piston starts down, likewise at another position of this tracing point when the piston is almost down, the intake port must close. For other positions on the path of said point, the exhaust port must open and close.

With the path of the motion fixed and the points on the path for opening and closing also fixed for each kind of port, the nature of the ports is quite restricted; but as the best set of ports is where both are of maximum area, this further requirement, completely determines the nature of the ports from the motion alone.

The shape, size and spacing apart, on the circumferential band of both types of ports are fixed by the motion of the sleeve; with a fixed diameter of sleeve a certain number of each of these ports is required for an aggregate area of each kind of port opening, required for a certain piston displacement.

The actual distance across this band of ports exceeds the circumference of said valve sleeve, so two of the exhaust ports must be displaced laterally to each other in the band. The phase of valve port openings relative to positions of the piston has, for the sake of simplicity, been shown as suitable at low speeds. At operating speeds the openings occur sooner.

A further feature of my invention resides in the fact that this mechanism can be used in an internal combustion engine of the type where the fuel is injected into the cylinder.

Other features of invention in an internal combustion engine reside in the operation of each of the single sleeve valves of two adjacent cylinders by a separate crank pin or other connection to a common rotary member or gear, positioned between said two adjacent cylinders at their lower ends, and rotating in a plane normal to and through the plane of the axes of the cylinders.

My invention also contemplates the operation of but one sleeve valve by a gear so located and having a single crank pin.

My invention further contemplates the operation of two sleeves of two adjacent cylinders by suitable connections, in different angular phase, to a common member or gear revolving through the plane of the axes of the two cylinders, and between them.

My invention further provides several features which are essential to compact construction. These are: first, a piston with clearance for sleeve ball socket; second, clearance in lower portion of cylinder walls for sleeve driving mechanism; third, a sleeve driving gear cage as hereinafter described, having clearance for cylinder walls and sleeve driving mechanism and having clearance for engagement of gear driving pinion and sleeve driving gear.

The various conventional arrangements of engine cylinders have axes of adjacent cylinders substantially in a common plane and are positioned radial from the axis of a common crank-shaft.

In the arrangement shown the cylinders' axes are radial to the crank-shaft axis and the plane of the cylinders' axes is substantially parallel to the crank shaft axis, but whether this plane is parallel or not to said shaft axis, the rotary or gear driver (of the sleeve-valve) is at the side there-of and has its axis parallel to the axis of the crank-shaft.

Independent of cylinder arrangements the sleeve valve driving element moves in a circular path, the plane of which is normal to the axis of the crank-shaft. In case of a gear driver, it is driven by a spur gear train of convenient connection from the crank-shaft. In the case of the driving element having circular motion by translation, (as the link drive shown) it is driven by eccentric means connected to the crank-shaft.

All foresaid sleeve-valve driving means whether spur gears, rotary or the element having circular motion by translation, have bearings in the crank-case, whereby the cylinders or cylinder-block may be removed from crank-case without disturbing the assembled relations of the sleeve-valve to its driving means, nor the said driving means (including the crank-shaft) to the crank-case.

In this single sleeve-valve type of engine some objects are:

(a) To provide a subassembly whereby lay-shaft may be assembled in direction of its axis into its bearings, and into gears in place in housings on the same body member of the engine (in this instance the crank-case) as holds the sleeve drive rotary or gear member.

(b) To provide both lay-shaft subassembly or operating means between the sleeve rotary driver, which axis is parallel to crank-shaft, and the crank-shaft, with bearings both upon the crank-case; with the rotary means between axes of adjacent cylinders, and having its axis beyond said cylinders.

(c) The said sleeve rotary driver is a gear or spur gear between axes of adjacent cylinders: said gear axes are parallel to crank-shaft axis, either has a bearing-housing on a wall of the crank-case which wall extends substantially normal to crank-shaft axis.

(d) In an engine of adjacent cylinders (substantially in a plane) with associated single sleeve valves (moving in a smooth closed curve) which are each driven by a member moving in a circular path, by a connection to an element comprising an eccentric strap (which eccentric's axis is parallel to crank-shaft axis) and eccentric is driven (by the most convenient connection depending on the cylinder arrangement with regard to axis of crank-shaft) from crank-shaft and has a bearing in crank-case wall.

With the above and other objects in view the invention consists in certain novel features of construction, combinations and arrangements of parts as will be more fully described and particularly pointed out in the appended claims.

Referring to the drawings in which like reference characters indicate corresponding parts.

Figures 33, 34, 35, 36, 37, 38, 39:
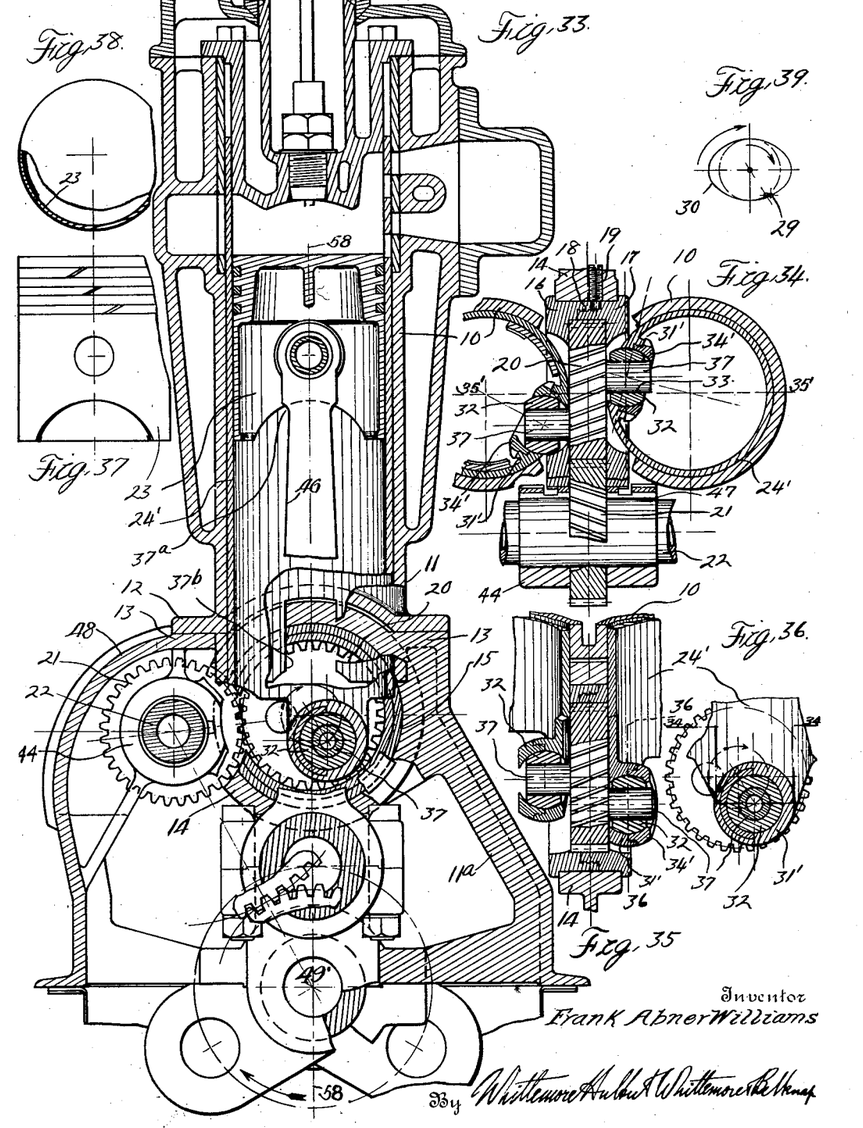
Figure 33 is a composite vertical sectional view through the engine.
Figure 34 is a transverse view through Figure 33 taken substantially on the plane indicated by line 34—34 of Figure 36.
Figure 35 is a composite vertical section through Figure 34.
Figure 36 is a section on the line 36—36 of Figure 35.
Figures 37 and 38 are respectively a side elevation and top plan view partly in section of the piston.
Figure 39 is a diagrammatic view showing the paths of travel of the crank pin and a point on the sleeve.

In Fig. 33, 58—58 is a center line of the cylinder.

Figures 1, 2, 3, 14, 15, 16, 17, 18, 19, 23, 24:
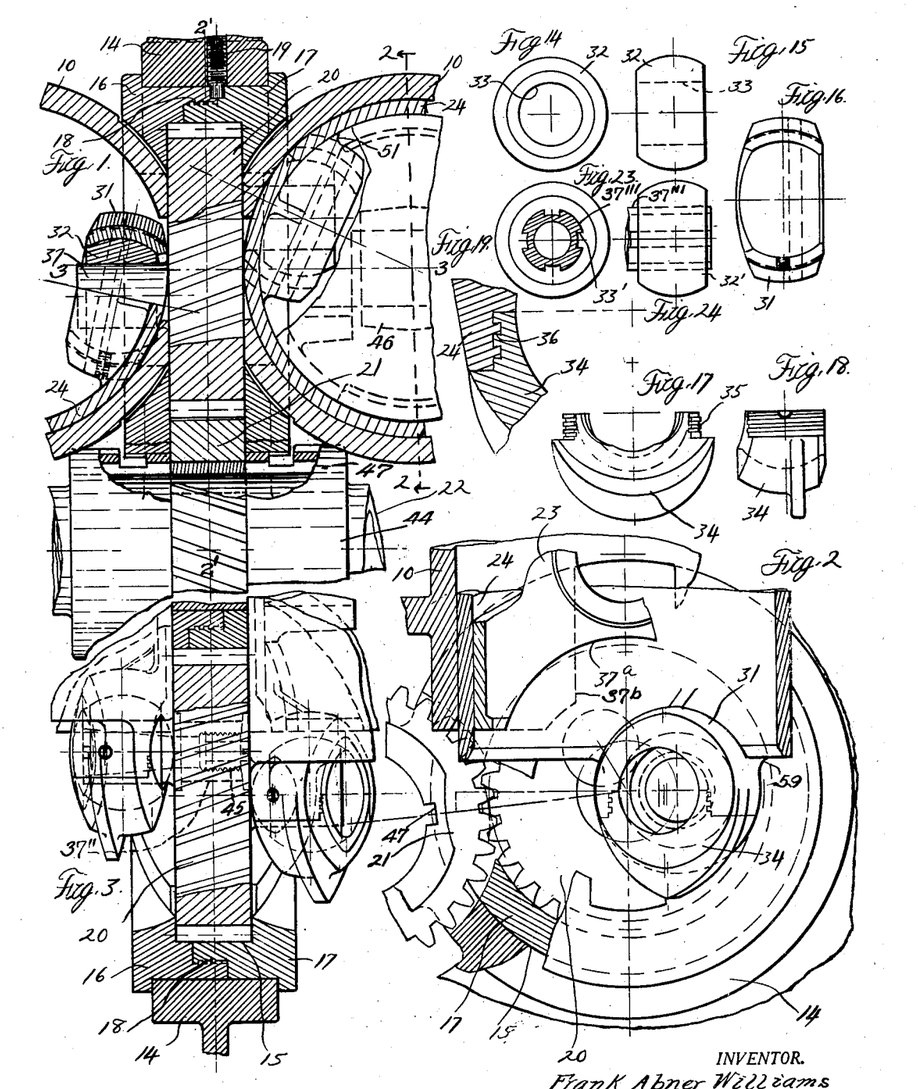
Figure 1 is a plan fragmentary view showing a pair of adjacent cylinders and the operating mechanism for the sleeve valves.
Figure 2 is a sectional view through 2—2 of Figure 1, except that part of the gear cage and its housing is taken through the right hand side of gears.
Figure 3 is a sectional view taken at right angles with the construction shown in Figure 2.
Figure 14 is a detail end elevation of the ball member.
Figure 15 is a side elevation view of the same.
Figure 16 is a plan view of the ball socket cap.
Figure 17 is an end view showing in detail the bottom cap construction.
Figure 18 is a side view of the same.
Figure 19 is a detail fragmentary view showing the joint between the bottom cap and ball socket with trapezoidal thread.
Figure 23 is a modified construction of ball member as shown in Figure 14.
Figure 24 is a side view of the same.
Figures 4, 5, 6:
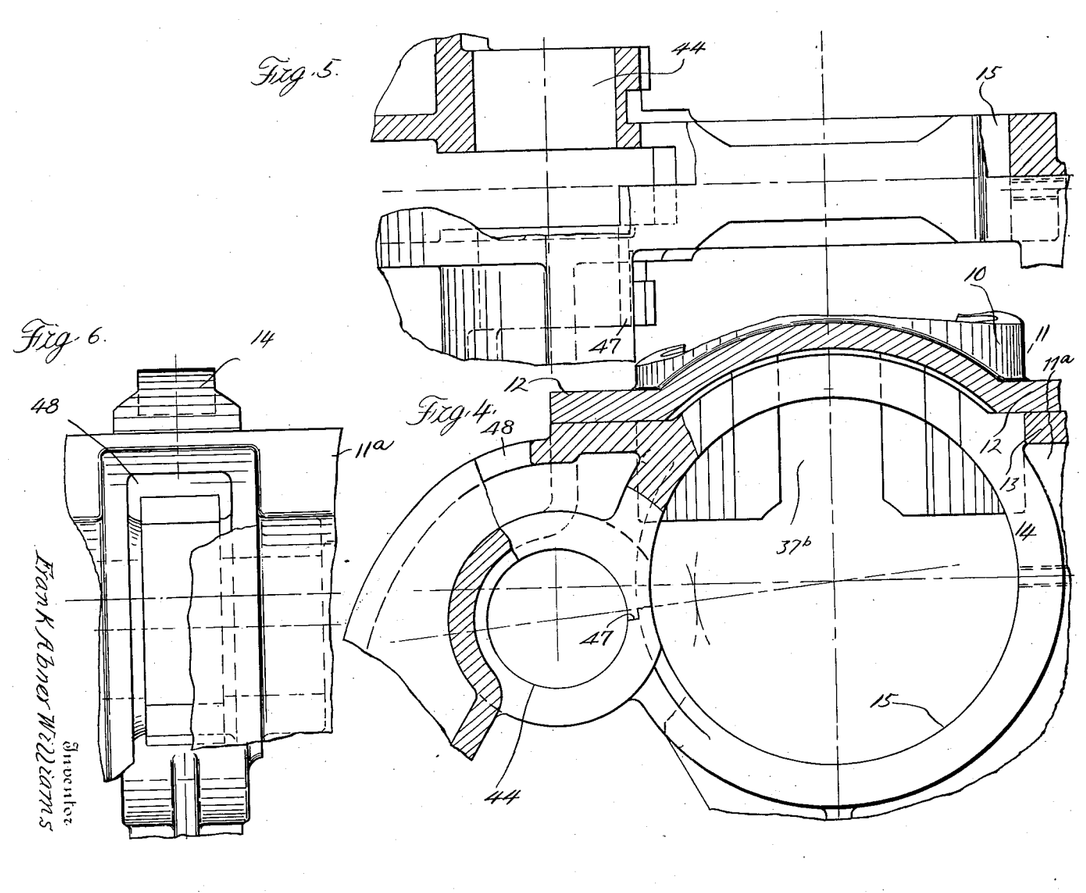
Figure 4 is a side elevation view partly in section showing the gear cage housing of the crank-case for the sleeve driving gear and the flanged cylinder bottom with clearance for driving gear.
Figure 5 is a plan view of the gear cage housing with a portion of the parts broken away to show the bearings for the sleeve driving gear and the driving gear shaft.
Figure 6 is an end elevation view of the casing shown in Figure 4.
Figures 7, 8, 9:
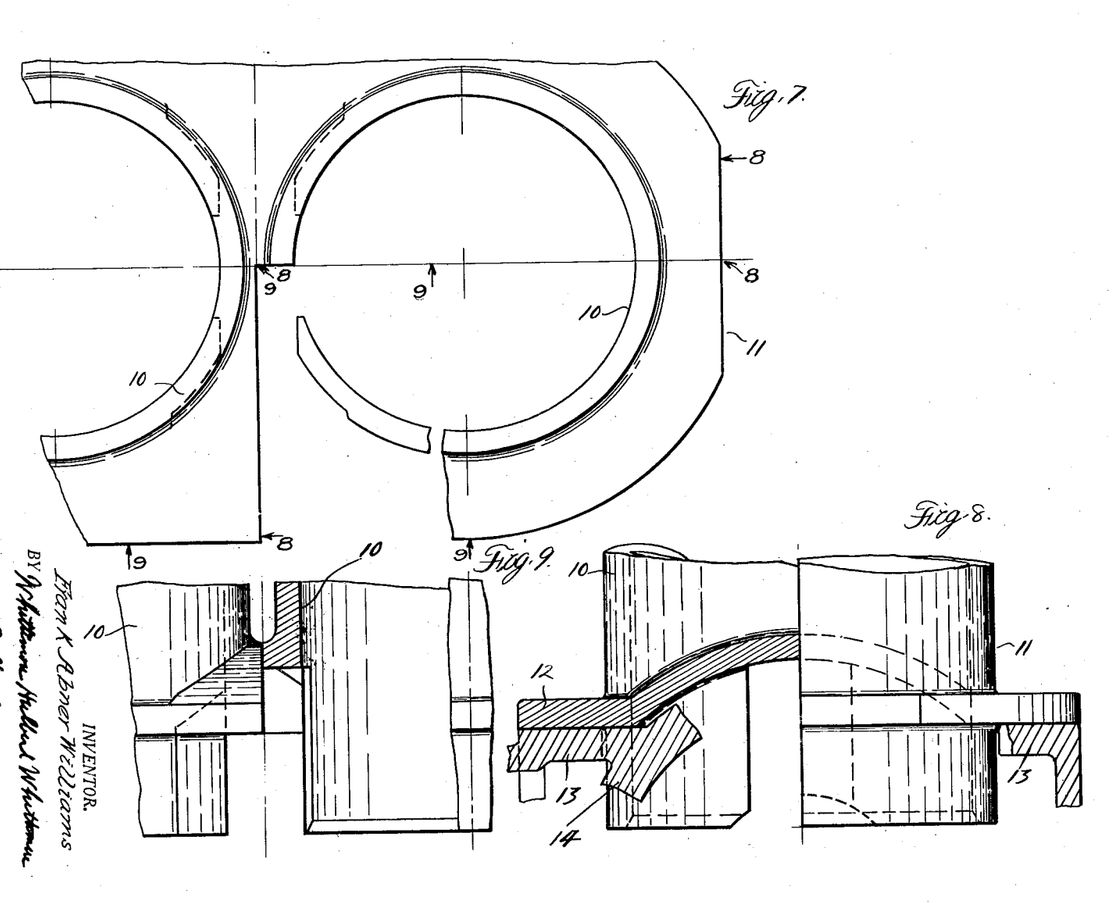
Figure 7 is a plan fragmentary view of the flanged cylinder block.
Figure 8 is a view along 8—8 of Figure 7.
Figure 9 is a view along 9—9 of Figure 7.
Figures 30, 31, 32:
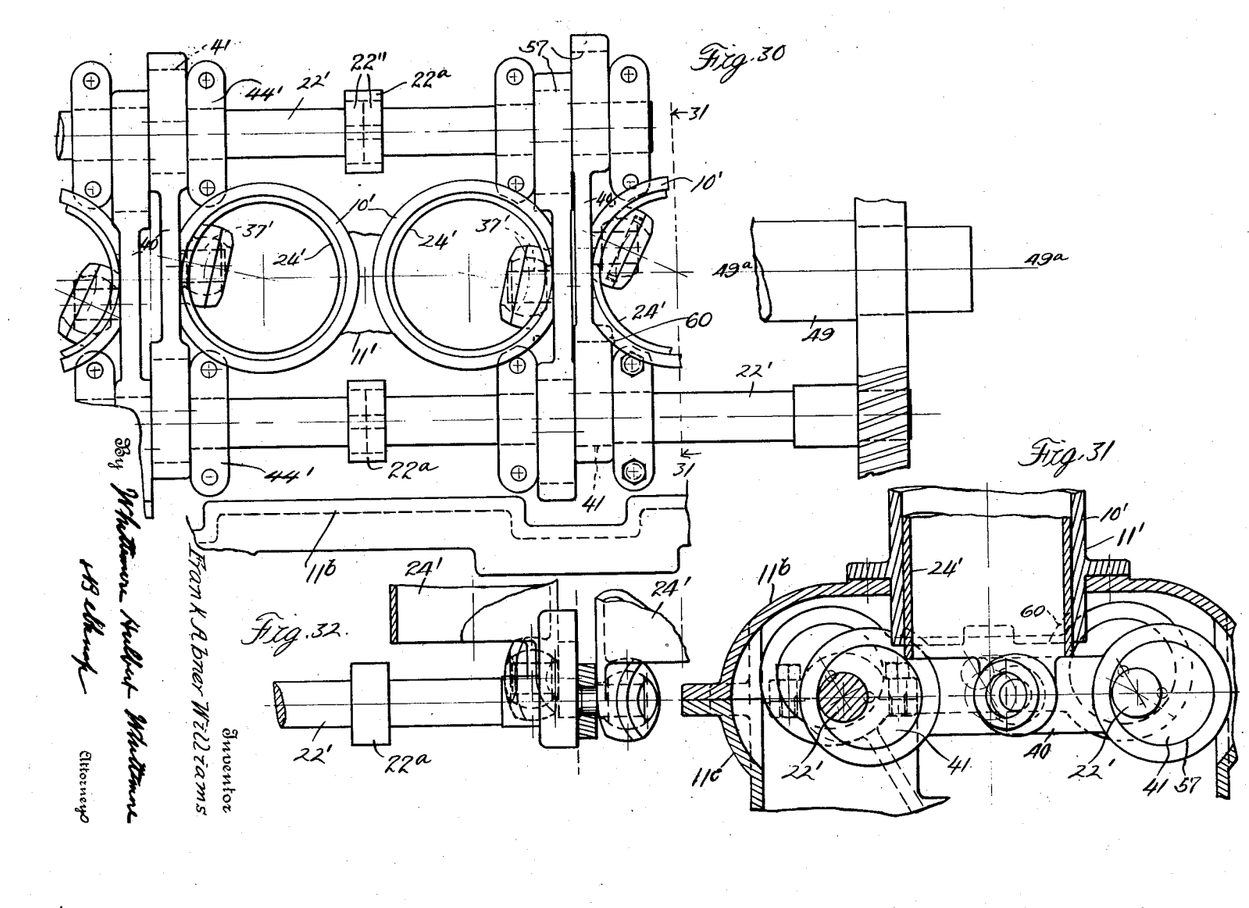
Figure 30 illustrates a modified arrangement of valve operating mechanism.
Figure 31 is a sectional view along 31—31 of Figure 30.
Figure 32 is a detail view showing the driving connection for the sleeve valves shown in Figure 30.

In the drawings, reference character 10 represents the cylinders of an engine such as an internal combustion engine, these cylinders preferably being arranged in line in accordance with common practice. As shown in Figure 7 these cylinders are preferably cast integrally in the form of a cylinder block 11 formed with the laterally extending flange 12 adapted to seat on the complementary flanged portions 13 of the crank case 11a (Figs. 4, 6 and 33) carrying the crank shaft as shown in Figs. 30 at 49 and 33 at 49'. The assembly of the two distinct elements, that is, the cylinder block and the crank case, is shown in Figs. 4, 8, 31, and 33 and is conventional, they being removably attached to each other by screws or bolts through their flanges, the crank shaft axis 3—3 is shown in Fig. 1, as 49a—49a in Fig. 30, and as 35'—35' in Fig. 34. Throughout this application the term "crankcase" is understood to comply with the foregoing and in particular: that—This "crank-case" is so constructed and attached to the cylinder-block and also to the sleeve-valve through and to its driving means by the latter's bearing, that said cylinders or cylinder-block may be readily removed from the crank-case leaving the assembly of said crank-case and the sleeve-valve and its drive means undisturbed. The gear cage housing 14 is preferably cast integrally with the crank case of the engine and is formed with a bore 15. As shown in Figures 33 and 8 the sleeve driving gear bearing housing 14 is integral with the crank case and with the lay shaft bearing housing bridges across the walls thereof between the flanges 13 which engage the flanges 12 of the cylinder block. These housings 14 extend between the axes of a pair of adjacent cylinders and the axes of the bores 15 are in the plane of the axes of the cylinders and beyond the cylinders, though part of the gear is between the cylinders in this instance as shown in Figs. 1, 2 and 3. Within the bore 15 are the complementary flanged bearing members 16 and 17, these members preferably being threadedly interengaged as shown at 18 and pinned with respect to the gear cage housing 14 as shown at 19. Within the bearing members 16 and 17 is located a sleeve driving gear 20, the latter being rotatably supported by the bearing afforded by the peripheral contact of the teeth and the sides of the gear with the bearing members 16 and 17. The bearing on the top of the gear teeth is the preferred construction. The gears 20 may be provided with helical teeth as shown, or with straight or herring bone teeth, and are adapted to be driven by pinions 21 driven from the driving shaft 22, the latter shaft being supported by the spaced bearings 44 which are preferably cast integrally with the gear cage housing 14 and crankcase as shown in Figures 4 and 5. The bearing 44 is preferably provided with a clearance slot 47 as partially shown in Figure 4 and as fully shown in Figure 2 for assembly of the lay-shaft and key to the lay-shaft gear. The shaft 22 receives its power through any suitable driving connection with a moving part of the engine such, for example, as the crank shaft. In Fig. 6, 48 indicates an aperture (shown here partly under a cover plate) through the crank case wall for assembly of the lay shaft gear, which may also pass through the bottom of the crank case.

Figure 1 shows a part of the key in shaft 22 extending into the pinion gear 21. Figure 4 shows the driving shaft, or lay-shaft bearing 44, and also shows a part of the key-way clearance 47 on the center line through the gear cage housing to assemble said shaft with key to its pinion gear 21 when in place.

The lay-shaft assembly is shown with pinion gear in place between the two parts of an intermediate annular bearing support 44, which is integral with the crankcase. The annular bearing support engages the enlargement of said shaft which, with key in place, is slid through said bearing which has a key-way clearance in the side thereof, to drive said pinion 21. The pinion is inserted through the bottom of the crankcase, or through an adjacent side opening 48 shown in Figs. 4 and 6 and whose cover contour is shown in Figure 33.

Figure 10:
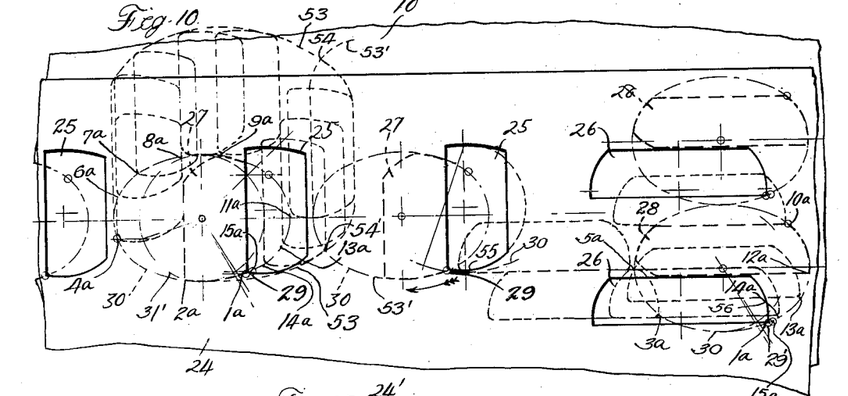
Figure 10 is a development of the sleeve and cylinder wall showing the arrangement of the ports.

Referring to Figure 2 the piston 23 which is typical, is shown spaced from the cylinder wall 10 by a sleeve valve 24. This member 24 may hereinafter be referred to as a valve-sleeve, valve or sleeve and in several figures is indicated by the reference character 24' on account of the difference in the ball socket construction. Referring to Figure 10 I have illustrated my preferred arrangement of ports, 25 representing a laterally arranged series of intake ports provided in the sleeve 24 and 26 indicating a vertically arranged series of exhaust ports in the sleeve 24. The ports 25 and 26 are adapted to respectively register with the ports or openings 27 and 28 formed in the cylinder wall 10 for respectively accommodating the intake of the fuel and the exhaust of the gases. By reason of the sleeve valve operating mechanism, the sleeve valve is given a combined rotational and reciprocatory motion as will presently be apparent so that any point on the sleeve valve such as 29 will travel in a path resembling an ellipse indicated at 30; as here shown the maximum diameter is on an axis extending circumferentially. The axial movement of the sleeve valve may hereinafter be described as sliding or reciprocating and the turning movement indicated as rotating or oscillating. The inlet and exhaust ports are arranged so as to afford efficient operation of the engine by providing each cylinder with a single sleeve valve as shown having the two exhaust ports arranged one above the other in conjunction with a straight row of three inlet ports arranged around the circumference of the sleeve with cylinder ports to suit. Maximum opening of all ports having substantially straight opening and closing sides and compactness of arrangement on a fixed diameter of sleeve is afforded, any point of which passes through a smooth closed curve. For simplicity of aperture shape, and compact arrangement of intake and exhaust ports in both sleeve and cylinders, the lower sides thereof are substantially lined up on a common circumference mostly above the travel of the piston rings.

A tracing point as 29 or 29' on the sleeve describes the enclosed paths 30 on the cylinder, within which are the cylinder intake and exhaust ports respectively. The top part of both sleeve and cylinder intake ports when full open are inward of the path 30, as indicated by the inside of the heavy lines.

Points 1ª, 2ª etc., to 15ª, are successive points indicated on the path 30. The intake ports open with 29 at 1ª and close with 29 at 4ª. Outside of this open interval they are closed (as any other conventional type sleeve ports) by a clearance sufficient to seal the ports as indicated by their positions with the trace point at 6ª, 7ª to 9ª, etc. The intake ports when full open with 29 at 2ª has the sleeve edge 55 entirely inward of the similar side (part of 30) of the cylinder port.

The sleeve intake port sides adjacent to point 29 are joined by a small arc contour as shown on the drawings to increase the seal at points beyond 9ª with a minimum reduction of port opening. Curves 53 and 53' are the envelopes of paths of sleeve adjacent intake ports which intersect at 54 and 54'; 53' approximately coincides for an interval with the curve 30.

The exhaust ports open with 29' at 10ª and close with 29' at 15ª. The interval from 15ª to 1ª (in the four cycle engine with piston near top of stroke) when the intake opens may suffice to prevent pre-ignition of the inflammable charge when such is used. When 29' is at 12ª with exhaust ports full open, the short end of sleeve port, as 56, and the opposite end of the cylinder port are somewhat inward of the path 30, as indicated by the heavy contours. The sleeve exhaust ports clear their cylinder ports enough to seal them at all positions of 29' from 15ª through 1ª, 3ª, etc., to 10ª, being similar in this respect to the action of the intake ports. The sleeve exhaust port sides at 29' also are connected by an arc contour as shown, which increases the seal at positions at 5ª and beyond.

Figure 20:
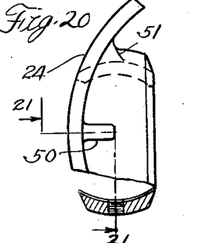
Figure 20 is a top plan view of the ball socket.
Figures 21, 22:
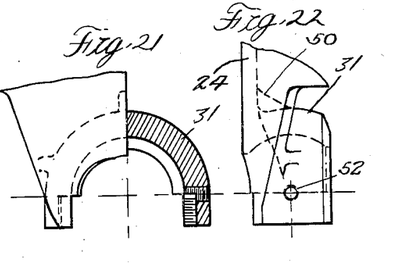
Figure 21 is a view along 21—21 of Figure 20.
Figure 22 is a side elevation view of the ball socket shown in Figure 20.

In order to impart the aforesaid movement to the sleeve valves 24, the latter are formed inside the sleeve and preferably at the lower ends thereof with a ball socket 31 which may open downwardly as shown in Figures 2 and 21. This ball socket 31 is shown ribbed to sleeve wall at 50 and 51 in Figs. 20 and 22. This ball socket surrounds a ball 32 which, as shown in Figures 1, 14 and 15, may be provided with an axial bore 33. The lower portion of the ball socket 31 may be closed by a bottom cap 34 shown in detail in Figures 17 and 18. This bottom cap may be provided with the dove tail thread 35 for engagement in the corresponding dove tail thread of the ball socket 31, thus forming the interengaged threaded connection 36 as shown in detail in Figure 19. In assembling the bottom cap 34 and ball 32 the latter is placed in the ball socket 31 and the cap is then given a partial rotative movement to engage the dove tail threads 35 with the corresponding threads of the ball socket, the ball socket cap is locked in place by a screw, the threaded hole 52 for which is shown in Figs. 22 and 20.

The extension of the ball socket into the bore of the sleeve strengthens the sleeve at the driving connection. The ball and socket joint is a connection of spherical surface contact and is understood as such thruout this application. The ball and socket joint is a spherical surface ball member inside of a ball-socket, the interior of which is correspondingly shaped to fit the ball, that is, a spherical surface of substantially the same diameter as the ball, and they have a common center, and each bears on the surface of the other. The ball socket is carried on the valve sleeve and extends into the axial projection of the bore, that is, the projection of the bore parallel to its axis. The center of the ball socket may be anywhere inside the outer cylindrical surface of the sleeve or its projection.

The connection from the sleeve driving gear to the sleeve consists of three elements, namely, the crank pin, the ball, and the ball socket of the sleeve. The crank pin, when on top or bottom center, that is, when in the plane of the valve axis, extends from the side of the gear thru a short clearance space into the sleeve. When the crank pin is at the side of this plane at the extreme distance, a considerable portion of the crank pin is outside of the sleeve. The ball 32 as shown in Figure 34 at the side position of this plane extends appreciably outside of the sleeve. The ball socket spherical surface, projected, extends outside the sleeve. Thus a portion of the connection from the gear to the sleeve is outside of the sleeve.

The sleeve driving gears 20 are each provided with the oppositely extending driving crank pins 37 or 37'' readily assembled last, either of which project through the bores 33 of the ball members 32. The cylinders 10 are provided with the openings 37ᵇ to clear the rotary driver and its connections to the sleeve valves. The piston is cut away at 37ª on the side at the bottom to clear the path of the sleeve ball socket to permit assembly. The gear crank pins 37 are preferably formed integrally though they may be assembled with the gears 20 and are arranged eccentrically with respect to the axis of rotation of each of the gears 20 and it will thus be apparent that rotation of the sleeve driving gears 20 will cause the combined oscillatory and reciprocatory movement of the sleeve valves. The joint formed by the ball 32 and ball socket 31 will compensate for the relative rotation of the sleeve valve and the driving pin 37, while the sliding connection afforded by the ball 32 and the crank pin 37 will permit the relative axial movement between the crank pin and the sleeve valve.

As stated in the foregoing paragraph, the crank pins may be assembled to the gear, one manner of so assembling the pins being shown in Figure 3. In the construction shown in that figure, the sleeve driving gear is counterbored on both sides to receive a shouldered hollow crank pin 37" which is fitted therein. The crank pin is internally threaded onto a screw 45 having an enlarged head (which may tightly fit into the gear) which securely clamps the crank pin to the gear.

It is preferable to drive each of the sleeve valves by a single connection with a sleeve driving gear so that the latter gears will preferably be arranged between a pair of cylinders' axes each driving gear 20 serving to actuate the sleeve valves of the two adjacent cylinders. The word gear, as used in my specification and claims, means—"A gear—one of two similar toothed wheels which are adapted to engage each other". More generally, the gear 20 will be positioned between the cylinders and also between their axes, and also between the sleeve-valves and between their axes. Part of the sleeve valve gear extends above the bottom line of the cylinders, that is, between their lower ends; thus an unduly long connecting rod is not required, and compactness is attained. This construction also permits the use of a shorter sleeve valve, and causes less inertia than a long sleeve valve.

The short connecting rod 46 shown in Figs. 1 and 33 gives a compact construction with part of the sleeve driving gear being between the cylinders and although this feature may also result solely from this rod, it also is with and due to the very long extension of the cylinders, as shown, or in conjunction with the high placement of said gear as shown.

It will be noted that I have provided a sleeve driving gear part of which is (as here shown) between the cylinders and whose axis is below the bottom of the cylinders by which is meant that the axis of the sleeve driving gear or rotary member lies between the open ends of the cylinders and the crankshaft, and whose axis is in the plane containing the axes of the cylinders. It will further be noted that this sleeve driving gear revolves through this plane of the axes of the cylinders and that the driving gear pins also revolve through this plane. By extending the driving gear pins within the cylinders or their extensions I have afforded a driving connection for the sleeve valves which is located within the extended cylinders and close to the axes of these cylinders, thus facilitating the operation of the sleeve valves and minimizing the frictional resistance to movement of the sleeve valves. Furthermore it will be noted that the provision of the gear cage housing between the axes or center lines extending through adjacent cylinders and which here is between adjacent cylinders which are cut away for clearance, affords means for mounting the gear to operate the sleeve valve where the cylinders are positioned closely adjacent to each other in accordance with the common practice. With my invention it is thus not necessary to unusually increase the distance between the cylinders of the engine with the result that I have provided a compact arrangement.

Such generalities as follow are for the interpretation of the specification and claims. All claims are of combinations and arrangements of the elements and parts as mentioned therein. The engine body members are the cylinder block and crank case, which are readily and removably attached to each other. The sleeve valve for a cylinder is one associated therewith, they having a common axis substantially radial to the crank shaft axis, and cylindrical surface contact with each other.

The rotary member has been described as positioned between the cylinders or between their axes. In the latter case it may be partly between the cylinders, or entirely beyond the ends of the cylinders.

The sleeve valve driving mechanism, that is, the gear 20, or its equivalent, is located between the cylinders, or by a cylinder and generally moves in a plane that is parallel to the sweep of the connecting rod or in other words normal to the crank-shaft axis. In order to clearly distinguish this latter position of the sleeve-valve driving mechanism it will, in some instances, hereinafter be referred to as positioned at the side of the cylinder.

Instead of forming the ball members as shown in Figures 14 and 15 I may form these ball members so that they will have a spline engagement with the crank pins 37''' as indicated at 33' in Figures 23 and 24. In this latter construction any tendency for the ball member 32' to rotate will be avoided, all such relative rotative movement taking place between the ball and socket members, at the same time the spline 33' will readily permit relative axial movement between the crank pin and the ball member 32'.

Figure 25:
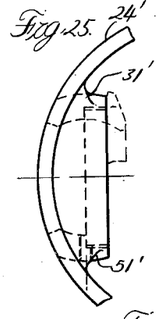
Figure 25 illustrates a modified construction of ball socket corresponding to that shown in Figure 20.
Figure 26:
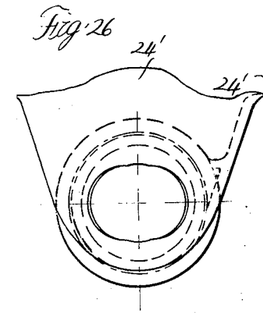
Figure 26 is an end elevation view of the same.
Figure 27:
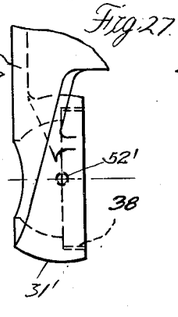
Figure 27 is a side view of the same as that shown in Figure 26.
Figure 28:
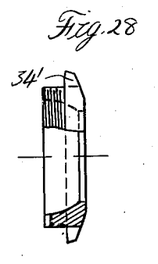
Figure 28 is a side elevation view partly in section showing the closure cap used in connection with the ball socket shown in Figure 25.
Figure 29:
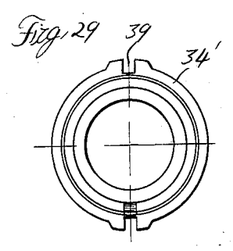
Figure 29 is an end view of this closure cap.

Instead of forming the ball socket with a downwardly opening portion to accommodate the bottom cap as shown in Figures 20 to 22, I may form this ball socket with a lateral opening as indicated in Figures 25 to 27, this being my preferred construction. In these figures the sleeve valve 24' is formed with the ball socket 31' which in Figs. 25, 26 and 27 is shown ribbed to the sleeve wall at 51', which ribs may be low enough to clear the piston which is provided as before with a bore for accommodating the ball and driving pin. Connections between the driving member and the sleeve valve, referred to in the specification and claims, as extending within the sleeve wall or bore will include also the projection parallel to the axis of said wall or bore of the valve. In this instance however, the axis of the bore extends normally to the axis of the sleeve horizontally and is closed at the bottom and open at the inner end 38. At this end the ball socket 31' is preferably threaded for engagement with the closure cap 34'. In Fig. 29, 39 are slots in the closure cap permitting engagement by a wrench or the like for turning the cap. The tight fitting ball socket cap is further locked in place by a screw through both parts of said socket, the threaded hole for which is shown in Figs. 25, 27 (here as 52'), 28 and 29. The outer edges of said socket are beveled to clear the sweep of the connecting rod as shown in Figs. 1, 16, 20, 25, 28, and 34.

Figures 11, 12, 13, 24A, 24B, 24C:
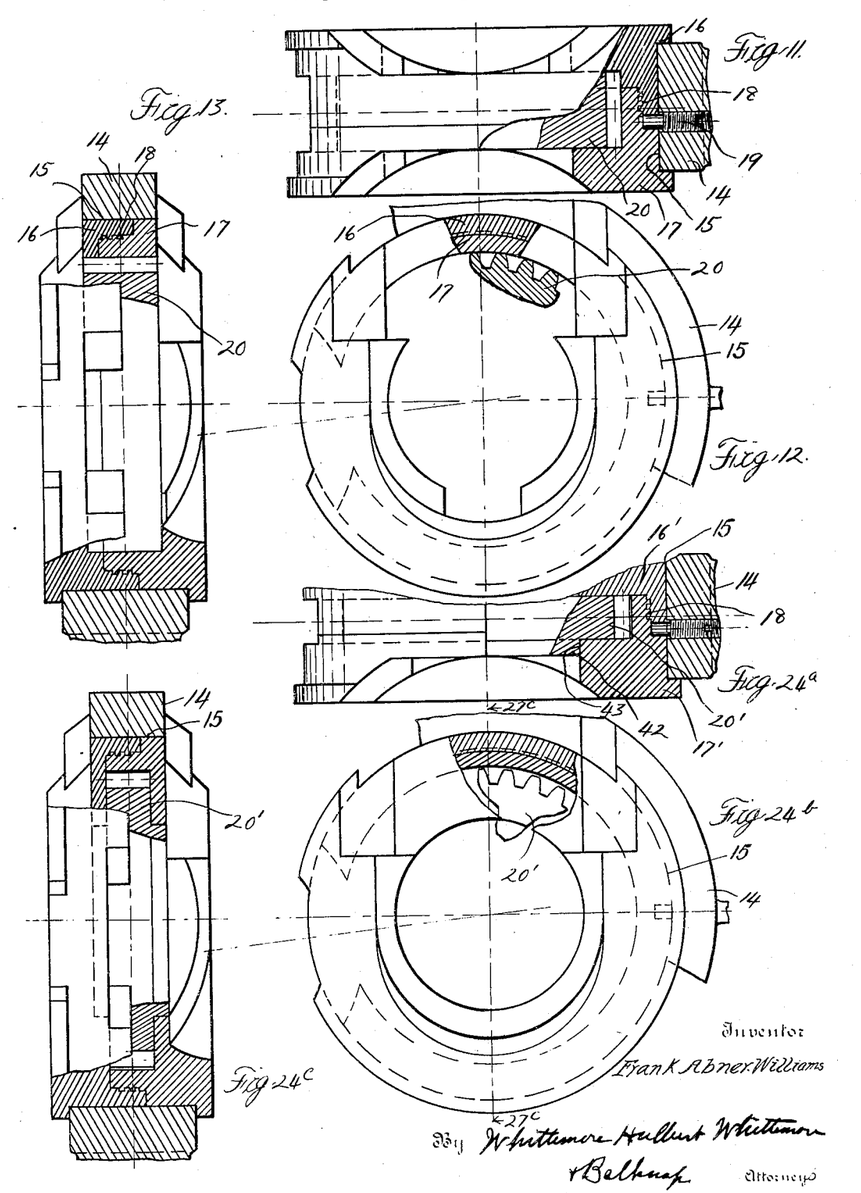
Figure 11 is top plan view of the cage ring bearing assembly for the sleeve driving gear.
Figure 12 is a side elevation view of the same.
Figure 13 is a sectional view of this bearing taken at right angles to the section shown in Figure 11.
Figure 24a is a plan view corresponding to Figure 11 illustrating a slightly modified bearing for the sleeve driving gear with short hubs.
Figure 24b is a side elevation view of the same.
Figure 24c is an elevation view of the same, in section along the line 27c—27c.

Referring to Figures 24ᵃ, 24ᵇ, and 24ᶜ, I have shown a slightly modified construction forming a bearing for the sleeve driving gear designated in this instance as 20'. In these figures the gear 20' is shown formed with a hub bearing 42, this bearing being rotatably supported in the bearing portion 43 of the complementary bearing member 17'. 16' is the other of the complementary bearing members, these members being connected as before at 18. In this modified construction, the driving gear is supported by the bearing hub 42 rather than by peripheral engagement of the gear teeth such as illustrated in Figure 11, but may be supported by a combination of both bearings.

Referring to Figures 30, 31, 32 I have shown a modified type of operating mechanism for the sleeve valves. The cylinders 10' and sleeve valves 24' are arranged substantially as before described, the sleeves in this instance being actuated by the crank pins 37' carried by the connecting rods 40 which are preferably arranged between a pair of adjacent cylinders as shown in Figure 30. These rods 40 are mounted on the eccentrics 41 of the driving shafts 22' rotatably supported in the spaced bearings 44'. By reason of the two driving shafts 22' and multiple connecting rods means is provided for avoiding a dead center in the movement of the rods 40. It is preferable to drive only one of these shafts 22', the other being a follower to avoid dead centers. In Figs. 30 and 31, are shown clearances on outside of cylinders by reference 60 for paths of the eccentric strap ends of the rods 40. In Fig. 30 the lay shaft locked joint internally splined ring 22ᵃ fits over the splined flanges 22" of the lay shafts, any part of which joint will pass through the bore 57 of the connecting rods 40.

The term "charge" as employed in the appended claims, designates either a mixture of fuel and air, or air without fuel, as in oil engine practice.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:

1. In an internal combustion engine a cylinder, and a sleeve valve operable within the cylinder, said valve being formed with a ball socket all of which extends inwardly from the outer surface of the sleeve valve wall, a rotary member positioned adjacent to the side of the cylinder and a ball-ring forming a driving connection between said member and the ball socket.

2. In an internal combustion engine a pair of adjacent cylinders, and a sleeve valve operable within each of said cylinders, a sleeve driving gear mounted for rotation between said cylinders' axes, said gear provided with two crank pins extending from opposite sides thereof, and means carried by the said valves for engaging said pins respectively, said means being located inwardly from the outer cylindrical surfaces of said valves and their extensions respectively.

3. In an internal combustion engine a pair of adjacent cylinders, a sleeve valve operable within each cylinder, a gear having a part thereof between said cylinders and connected to each of said valves for actuating said valves with a combined oscillatory and reciprocatory movement, a shaft extending adjacent to the lower ends of said cylinders, and a mating gear carried by said shaft for rotating said sleeve actuating gear, by direct contact therewith.

4. In an internal combustion engine, two adjacent cylinders, and a sleeve valve operable within one of said cylinders, a sleeve driving gear between said cylinders' axes, a drive connection from said gear to the sleeve valve, and a bearing for said gear, adapted for engagement with the periphery of the teeth of the said gear.

5. In an internal combustion engine, two adjacent cylinders and a sleeve valve operable within one of said cylinders, a gear between said cylinders' axes and revolving in a plane parallel to the axis of a cylinder, a drive connection from said gear to the sleeve valve and a bearing for said gear, adapted for engagement with the periphery and sides of the gear.

6. In an internal combustion engine, two adjacent cylinders and a sleeve valve operable within one of said cylinders, a gear positioned between said cylinders' axes, a drive connection from said gear to said valve, a gear cage housing and a pair of complementary bearing members positioned between the gear cage housing and gear and affording peripheral and side bearing contact with said gear.

7. In an internal combustion engine, the combination with a pair of adjacent cylinders having their axes parallel, of a sleeve valve operable within one of said cylinders, a gear having a part thereof positioned between the lower parts of said cylinders and rotating through the plane of their axes, said gear carrying an eccentric pin projecting from the side thereof and a ball and socket joint carried by said valve, inside the outer surface thereof and its extension and engaged by said pin.

8. In an internal combustion engine, the combination with a pair of adjacent cylinders having their axes parallel, of a sleeve valve operable within each of said cylinders, a gear having a part thereof positioned between the lower parts of said valves and rotating through the plane of their axes, said gear carrying two eccentric pins one projecting from each side thereof engageable with a ball and socket joint carried by the adjacent sleeve-valve, said joint having its center inside the outer surface of the valve wall and its extension.

9. In an internal combustion engine, the combination with a pair of adjacent cylinders having their axes parallel, of a sleeve valve operable within each of said cylinders, a gear having a part thereof positioned between the lower parts of said valves and rotating through the plane of their axes, said gear carrying two eccentric pins one projecting from each side thereof engageable with a ball and socket joint carried by the adjacent valve inside the outer cylindrical surface thereof, and its extension.

10. In an internal combustion engine, the combination with a pair of adjacent cylinders having an arched flange between them at their lower ends and having their axes parallel, of a sleeve valve operable within each of said cylinders, a gear having a part thereof positioned between the lower parts of said valves, and rotating through the plane of their axes, a gear cage housing beneath said arched flange and attached to the crank case of said engine, a gear cage bearing comprising a pair of interengaged threaded flanged rings supported by said housing, the flanges on said rings engaging the sides of said housing, said bearing adapted to rotatably support said gear, and two eccentric pins carried by said gear and connected to operate said valves.

11. In an internal combustion engine, the combination with a pair of adjacent cylinders having their axes parallel, of a sleeve valve operable within each of said cylinders, a gear having a part thereof positioned between the lower parts of said valves and rotating through the plane of their axes, a gear cage housing carried by the crank case of said engine, a gear cage supported by said housing, said gear having the outer peripheral surfaces of its teeth bearing against the inner peripheral surface of said gear cage, and means carried by said gear engageable with said valves for operating said valves.

12. In an internal combustion engine, the combination with a pair of adjacent cylinders having their axes parallel, of a sleeve valve operable within each of said cylinders, a gear having a part thereof positioned between the lower parts of the valves and rotating through the plane of their axes, said gear carrying a crank pin on each side thereof, each pin being splined and sliding through a splined ball rotating in a ball socket carried by the adjacent valve inside the outer cylindrical surface thereof and its extension.

13. In an internal combustion engine, the combination with a pair of adjacent cylinders having an arched flange between them adjacent to their open ends and having their axes parallel, of a sleeve valve operable within each of said cylinders, a gear rotatably mounted beneath said arched flange and between the cylinders, said gear rotating through the plane of the axes of the cylinders, and mechanism for operating said sleeve valves from said gear, said cylinders having portions of their walls extending below said arched flange cut away to clear said valve operating mechanism.

14. In an internal combustion engine, a cylinder, a sleeve valve operable within said cylinder, provided with a plurality of inlet and exhaust ports, said inlet ports and a group of two exhaust ports being arranged in a circumferential band with said exhaust ports displaced along the length of said sleeve valve from each other, and means to slide and rotate said valve engaging the valve and extending inwardly from the valve wall whereby said valve has a greater rotative than sliding movement imparted thereto.

15. In an internal combustion engine, a pair of cylinders, a sleeve-valve operable within each cylinder, a rotatable member between the valves and between their axes and a drive connection from said member to each sleeve-valve extending inwardly from the sleeve-valve wall for sliding and rotating said valve.

16. In an internal combustion engine, two adjacent cylinders, a sleeve-valve operable in one of them, a driving gear between the cylinders' axes, a bearing for said gear engageable by the periphery of its teeth, a crank pin carried by said gear and a ball and socket joint on the sleeve-valve engaged by said pin, said joint inwardly from the valve wall and comprising a threaded socket closer cap adjacent to the valve axis to which the axis of said cap is substantially normal.

17. In an internal combustion engine, two adjacent cylinders, a sleeve valve operable in each cylinder, a driving gear between the valves and between their axes, a bearing for said gear engaged by the periphery of its teeth, a separate crank pin carried on each side of said gear in different angular phase, and a ball and socket joint on each sleeve-valve engaged by the adjacent said pin, said joints inwardly from the valve walls and each comprising a threaded socket closer cap adjacent to the valve axis to which the axis of said cap is substantially normal.

18. In an internal combustion engine, two adjacent cylinders, a sleeve valve operable in one of them, a driving gear between the cylinders' axes, a bearing for said gear engaged by the periphery of its teeth, and a driving connection between the gear and the sleeve valve, said connection extending inwardly from the valve wall.

19. In an internal combustion engine, two adjacent cylinders, a sleeve-valve operable in each of them, a driving gear between the cylinders' axes, a bearing for said gear engaged by the periphery of its teeth, a driving connection on each side of said gear in different angular phase, to the adjacent sleeve valve, said connection extending inwardly from the valve wall.

20. In an internal combustion engine, the combination with a pair of adjacent cylinders having their axes parallel, of a sleeve valve operable within each of said cylinders, a gear having a part thereof positioned between the lower parts of said valves and rotating through the plane of their axes and means connecting said gear to both of said sleeve valves and extending inwardly from the valve wall to operate said sleeve valves.

21. In an internal combustion engine, the combination with a pair of adjacent cylinders, of a sleeve valve operable within each of said cylinders, a gear having a part thereof positioned between the lower parts of said valves and rotating between their axes, said gear carrying eccentric pins, one projecting from each side thereof, and a ball and socket joint carried by each sleeve valve each of said sleeves extending inwardly from the valve wall and operatively engaged by the adjacent said pin.

22. In an internal combustion engine, a pair of adjacent cylinders, a sleeve valve operable within one of said cylinders, a gear between the cylinders' axes, a crank pin carried by said gear and extending inwardly from the valve wall and a ball and socket joint carried by the sleeve valve and operatively engaged by said pin.

23. In an internal combustion engine, a pair of adjacent cylinders, a sleeve valve operable within one of said cylinders, a gear having a part thereof between the cylinders, and rotating between their axes for actuating said sleeve valve with a combined oscillatory and reciprocatory motion, said gear connected to a ball and socket joint of spherical surface contact carried by the sleeve, and a second gear directly driving the first mentioned gear.

24. In an internal combustion engine, a pair of adjacent cylinders, a sleeve valve operable within one of said cylinders, a rotary member between the cylinders' extended bores and rotating between their axes, and a drive connection from the rotary member to the sleeve valve, extending inwardly from the sleeve valve wall.

25. In an internal combustion engine, a pair of adjacent cylinders, a sleeve valve operable within one of said cylinders, a driving member between the cylinders' extended bores and operating between their axes, a connecting pin carried by said driving member extending inwardly from the sleeve valve wall, and a ball and socket joint carried by the sleeve valve, within the outer surface of the sleeve valve wall and its extension, operatively engaged by said pin.

26. In an internal combustion engine, a pair of adjacent cylinders, a sleeve valve operable within one of said cylinders, a driving member between the cylinders' extended bores and operating between their axes, a connecting pin carried by said driving member extending inwardly from the sleeve valve wall, and a ball and socket joint carried by the sleeve valve extending inwardly from the sleeve valve wall, operatively engaged by said pin.

27. In an internal combustion engine, a pair of adjacent cylinders, a sleeve valve operable within one of said cylinders, a rotary member between the cylinders' extended bores and rotating between their axes, a crank pin carried by said rotary member and extending inwardly from the sleeve valve wall, and a ball and socket joint carried by the sleeve valve, extending inwardly from the sleeve wall, and operatively engaged by said pin.

28. In an internal combustion engine, the combination with a cylinder and a sleeve valve operable within said cylinder, of a rotary member adjacent to the side of the sleeve valve, carrying a crank pin extending inwardly from the sleeve valve wall, and a ball and socket joint carried by the sleeve valve, said crank pin sliding through the ball member of said joint.

29. In an internal combustion engine, the combination with a cylinder and a sleeve valve operable within said cylinder, of a rotary member adjacent to the side of the sleeve valve, carrying a crank pin extending inwardly from the sleeve valve wall, a drive connection from said pin to the sleeve valve, and a piston operable within the sleeve valve, having a clearance at the side of its open end for the path of the said drive sleeve connection.

30. In an internal combustion engine, a pair of adjacent cylinders, a sleeve valve operable within each cylinder, a rotary member between the axes of said cylinders and between the valves, and two crank pins in different angular phase, carried by said rotary member on opposite sides thereof, each extending inwardly from the sleeve valve wall, and a ball and socket joint carried by each sleeve valve, and operatively engaged by said pin.

31. In an internal combustion engine, a cylinder and a sleeve valve operable within said cylinder, a rotary member adjacent to the sleeve valve and connected to a ball and socket joint, the ball socket carried on the sleeve valve wall and extending inwardly thereof, said socket having an opening opposite the sleeve valve axis, and having a threaded ball cap whose axis is substantially normal to the axis of the sleeve valve.

32. In an internal combustion engine, a pair of adjacent cylinders, a sleeve valve operable to slide and rotate within one of said cylinders, a gear adjacent to the lower ends of the cylinders, said gear rotating between the axes of the cylinders, and means carried by said gear extending inwardly from the sleeve valve wall, and a ball and socket joint carried by the sleeve valve, operatively engaged by said means, the ball socket being within the outer surface of the sleeve valve wall and its extension.

33. In an internal combustion engine, a cylinder, a sleeve-valve operable within said cylinder, a driving gear adjacent to said valve and a drive connection from said gear to said valve comprising a ball and socket joint, the ball socket being carried by said valve and extending inwardly from the sleeve valve wall.

34. In an internal combustion engine, a cylinder, a sleeve-valve operable within said cylinder, a driving gear adjacent to said valve and a drive connection from said gear to said valve comprising a ball and socket joint, the ball socket being carried by said valve and having its center within the outer surface of the sleeve wall and its extension.

35. In an internal combustion engine, a cylinder, a sleeve-valve operable within said cylinder, a driving gear adjacent to said valve and a drive connection from said gear to the sleeve-valve, extending inwardly from the sleeve valve wall.

36. In an internal combustion engine, a cylinder, a sleeve-valve operable within said cylinder, a driving member adjacent to said sleeve-valve and a drive connection from said member to the sleeve valve comprising a ball and socket joint, the ball socket being carried on the sleeve valve wall and extending inwardly thereof, said socket having a threaded closure cap.

37. In an internal combustion engine, a cylinder, a sleeve-valve operable within said cylinder, a gear at the side of said cylinder and adjacent to said sleeve-valve, a bearing engaged by the periphery of the teeth of said gear and a ball and socket joint drive connection from said gear to said valve.

38. In an internal combustion engine, a pair of adjacent cylinders, a sleeve-valve operable within one of said cylinders, a gear having a part thereof between said cylinders and between their axes for actuating said sleeve-valve with a combined oscillatory and reciprocatory motion, a shaft extending adjacent to the lower ends of said cylinders and a mating gear carried by said shaft for rotating said sleeve actuating gear, by direct contact therewith.

39. In an internal combustion engine, a pair of adjacent cylinders, a sleeve-valve operable within one of said cylinders, a rotary member part of which is between the cylinders and between their axes in the direction of which it extends beyond the end of the cylinders, and a drive connection from said rotary member to said sleeve-valve.

40. In an internal combustion engine, a pair of adjacent cylinders, a sleeve-valve operable within one of said cylinders, a gear, part of which is between the cylinders and between their axes in the direction of which it extends beyond the ends of the cylinders, and a universal socket-joint of surface contact throughout connecting the sleeve-valve to the gear and a second gear directly driving the first mentioned gear.

41. In an internal combustion engine, a pair of adjacent cylinders, a sleeve-valve operable within each of said cylinders, a rotary member, part of which is between the cylinders and between their axes in the direction of which it extends beyond the ends of the cylinders, and a drive connection from said rotary member to each of said sleeve-valves.

42. In an internal combustion engine, a pair of adjacent cylinders, a sleeve-valve operable within each of said cylinders, a gear, part of which is between the cylinders and between their axes in the direction of which it extends beyond the ends of the cylinders, a universal socket-joint of surface contact throughout establishing a drive connection to each of the sleeve-valves from said gear, and a second gear directly driving the first mentioned gear.

43. In an internal combustion engine, a pair of adjacent cylinders, a sleeve-valve operable within one of said cylinders, a rotary member, part of which is between the cylinders' extended bores and between their axes in the direction of which it extends beyond the ends of the cylinders, a drive connection from said rotary member to the valve, extending inwardly from said valve wall.

44. In an internal combustion engine, a pair of adjacent cylinders, a sleeve-valve operable within one of said cylinders, a gear between said cylinders' axes and adjacent to the ends of the cylinders, a drive connection from said gear to the valve, extending inwardly from the valve wall.

45. In an internal combustion engine, a pair of adjacent cylinders, a sleeve-valve operable within one of said cylinders, a gear between said cylinders and between their axes and adjacent to the ends of the cylinders, a crank pin carried by said gear and a ball and socket joint of spherical surface contact forming a drive connection from said gear to said valve, the ball socket extending inwardly from the valve wall.

46. In an internal combustion engine, a pair of adjacent cylinders, a sleeve-valve operable within one of said cylinders, a gear between the cylinders' axes and adjacent to the ends of the cylinders, an annular bearing for said gear on the top of its teeth, a connection to said valve from said gear and a second gear directly driving the first mentioned gear.

47. In an internal combustion engine, a pair of adjacent cylinders, a sleeve-valve operable within one of said cylinders, a gear between the cylinders' axes and adjacent to the ends of the cylinders, an annular bearing for said gear on the top of its teeth, a universal socket joint of surface contact throughout forming a drive connection to the sleeve-valve from said gear and a second gear directly driving the first mentioned gear.

48. In an internal combustion engine, a pair of adjacent cylinders, a sleeve-valve operable within one of said cylinders, a gear between the cylinders' axes and adjacent to the ends of the cylinders, an annular bearing for said gear on the top of its teeth, a ball and socket joint drive connection of spherical surface contact to the sleeve-valve from the gear and a second gear directly driving the first mentioned gear.

49. In an internal combustion engine, two adjacent cylinders, a single sleeve-valve operable in each of said cylinders, a point on each of said valves moving through a smooth closed curve, a piston within each of said valves connected to a common crank-shaft, a gear, part of which is adjacent to the side of one of said cylinders and in the direction of whose axis it extends beyond the end of the cylinder and operably connected to the valve therein, the axis of said gear being substantially parallel to that of the crank-shaft, and a second gear directly driving the first mentioned gear.

50. In an internal combustion engine, two adjacent cylinders, a single sleeve-valve operable in each of said cylinders, a point on each of said valves moving through a smooth closed curve, a piston within each of said valves, a crank shaft, drive connections to said pistons from said crank shaft, a gear, part of which is adjacent to the side of one of said cylinders in the direction of the axis whereof it extends beyond the end of the cylinder, a ball and socket joint of spherical surface contact forming a drive connection from said gear to each of said valves, the axis of said gear being substantially parallel to that of the crank-shaft, and a second gear directly driving the first mentioned gear.

51. In an internal combustion engine, two adjacent cylinders, a single sleeve-valve operable within each of said cylinders, a point on each of said valves moving through a smooth closed curve, a piston within each of said valves, a crank-shaft, drive connections from said crank-shaft to said pistons, a gear, part of which is adjacent to the side of one of said valves, a drive connection from said gear to said valve extending inwardly from the valve wall, the axis of said gear being substantially parallel to that of the crank-shaft, and a second gear directly driving the first mentioned gear.

52. In an internal combustion engine, a pair of adjacent cylinders, a sleeve-valve operable within one of said cylinders, a point on said sleeve-valve moving through a smooth closed curve, a rotary member, part of which is between the cylinders and between their axes in the direction of which it extends beyond the ends of the cylinders, a part of the wall of one of the cylinders being removed to clear said rotary member, a drive connection from said rotary member to said sleeve-valve, a shaft extending longitudinally of said cylinders, and means carried by said shaft for driving said rotary member.

53. In an internal combustion engine, a pair of adjacent cylinders, a sleeve-valve operable within each of said cylinders, a point on each of said sleeve-valves moving through a smooth closed curve, a rotary member, part of which is between the cylinders and between their axes in the direction of which it extends beyond the ends of said cylinders, a drive connection from said rotary member to each of said sleeve-valves, a part of each of said cylinders being removed to clear a part of the valve driving mechanism, a shaft extending longitudinally of said cylinders, and means carried by said shaft for driving said rotary member.

54. In an internal combustion engine, a pair of adjacent cylinders, a sleeve-valve operable within one of said cylinders, a point on said sleeve-valve moving through a smooth closed curve, a gear, part of which is between the cylinders and between their axes in the direction of which it extends beyond the ends of said cylinders, a part of the wall of one of said cylinders being removed to clear said gear, a ball and socket joint of spherical surface contact forming a drive connection from said gear to said sleeve-valve, a shaft extending longitudinally of said cylinders, and a mating-gear carried by said shaft for driving by direct contact, said sleeve-valve driving gear.

55. In an internal combustion engine, a pair of adjacent cylinders, a sleeve-valve operable within one of said cylinders, a point on said sleeve-valve moving through a smooth closed curve, a rotary member, part of which is between the cylinders and between their axes in the direction of which it extends beyond the ends of the said cylinders, a drive connection from said rotary member to said sleeve-valve, a part of said cylinder wall being removed to clear the path of the connection, a shaft extending longitudinally of said cylinders, and means carried by said shaft for driving said rotary member.

56. In an internal combustion engine, a pair of adjacent cylinders, a sleeve-valve operable within one of said cylinders, a point on said sleeve-valve moving through a smooth closed curve, a gear, part of which is between the cylinders and between their axes in the direction of which it extends beyond the ends of said cylinders, a drive connection from said gear to said sleeve-valve, a part of said cylinder wall being removed to clear the path of the connection, a shaft extending longitudinally of said cylinders, and a mating gear carried by said shaft for driving, by direct contact, said sleeve-valve driving gear.

57. In an internal combustion engine, a pair of adjacent cylinders, a sleeve-valve operable within one of said cylinders, a point on said sleeve-valve moving through a smooth closed curve, a gear, part of which is between the cylinders and between their axes in the direction of which it extends beyond the ends of said cylinders, a ball and socket joint of spherical surface contact forming a drive connection from said gear to said sleeve-valve, a part of said cylinder wall being removed to clear the path of said connection, a shaft extending longitudinally of said cylinders, a mating gear carried by said shaft for driving, by direct contact, said sleeve-valve driving gear.

58. In an internal combustion engine, a pair of adjacent cylinders, a sleeve valve operable within one of said cylinders, a point on said sleeve-valve moving through a smooth closed curve, a rotary member, part of which is between the extended bores of the cylinders and between their axes in the direction of which it extends beyond the ends of the cylinders, a bearing for the sleeve drive rotary member, a part of said bearing being removed to clear the wall of one of said cylinders, a drive connection from said rotary member to said sleeve-valve, a shaft extending longitudinally of said cylinders, and means carried by said shaft for driving said sleeve rotary member.

59. In an internal combustion engine, a pair of adjacent cylinders, a sleeve-valve operable within one of said cylinders, a point on said sleeve-valve moving through a smooth closed curve, a drive member between the cylinders' extended bores and between their axes, a bearing for said sleeve-valve drive member, a part of said bearing being removed to clear the wall of one of the cylinders, and a drive connection from said drive member to said sleeve-valve.

60. In an internal combustion engine, a cylinder and a single sleeve valve operable therein from a connection to said valve extending inwardly from the valve wall, said connection being driven directly by a rotary member adjacent to the lower end of said valve, said cylinder having an exhaust port substantially within a smooth closed curve traced on the cylinder wall by a point on the sleeve valve, the major axis of said curve extending circumferentially to the cylinder, the opposite ends of said exhaust port being derived from portions of said curve, and being adjacent to the extremities of the major axis of said closed curve, said cylinder having an intake port substantially within another similar closed curve, similarly situated on the wall of said cylinder, with respect to the axis thereof, the opposite ends of said intake port being derived from said closed curve and being adjacent to the extremities of the minor axis thereof, said valve having suitable exhaust and intake ports to register in proper periods respectively with their corresponding cylinder ports.

61. In an internal combustion engine, a cylinder and a single sleeve valve operable therein from a connection to said valve extending inwardly from the wall of said valve, said connection being directly from a rotary member adjacent to the lower end of said valve, a point on which traces a smooth closed curve whose minor axis is parallel to the cylinder axis, on the wall of said cylinder, said cylinder having exhaust ports and intake ports having ends that are curves derived from parts of said curve, and each having their ends connected by two sides to enclose said port, a substantial part of the closing side of an exhaust port being substantially normal to a substantial part of the opening side of an intake port, the sleeve valve having suitable exhaust and intake ports to register in proper periods with their corresponding cylinder ports.

62. In an internal combustion engine, a pair of adjacent cylinders, a sleeve valve operable to oscillate and reciprocate within one of said cylinders, a gear which is adjacent to the side of said valve and whose axis is below the cylinders and which rotates between their axes, a drive connection to said valve from said gear, and a bearing for said gear, a part of which is removed to clear the wall of each of said cylinders.

63. In an internal combustion engine, a pair of adjacent cylinders, a sleeve valve operable to oscillate and reciprocate within one of said cylinders, a gear which is adjacent to the side of said valve and whose axis is below said cylinders and which rotates between their axes, a drive connection to said valve from said gear, and a bearing for said gear, a part of the wall of each of said cylinders being removed to clear said bearing.

64. In an internal combustion engine, a pair of adjacent cylinders, a sleeve valve operable to oscillate and reciprocate within one of said cylinders, a gear which is adjacent to the side of said valve and whose axis is below the cylinders and which rotates between their axes, a drive connection to said valve from said gear, and a bearing for said gear, a part of which is removed to clear the wall of each of said cylinders, and a part of the wall of each of said cylinders being removed to clear said bearing.

65. In an internal combustion engine, a pair of adjacent cylinders, a sleeve valve operable to oscillate and reciprocate within one of said cylinders, a rotary member which is adjacent to the side of said valve and whose axis is below the cylinders and which rotates between their axes, and a drive connection to the valve from said rotary member extending inwardly from said valve wall.

66. In an internal combustion engine, a pair of adjacent cylinders, a sleeve valve operable to oscillate and reciprocate within each of said cylinders, a rotary member which is between cylinders, a rotary member which is below the sides of said valves and whose axis is below the cylinders and which rotates between their axes, and drive connections, one to each adjacent said valve from said rotary member, extending inwardly from the valve wall.

67. In an internal combustion engine, a pair of adjacent cylinders, a sleeve valve operable to oscillate and reciprocate within one of said cylinders, a rotary member which is adjacent to the side of said valve and whose axis is below the cylinders and which rotates between their axes, and a ball and socket joint drive connection of spherical surface contact, from said rotary member to said valve, extending inwardly from the valve wall.

68. In an internal combustion engine, a pair of adjacent cylinders, a sleeve valve operable to oscillate and reciprocate within one of said cylinders, a gear which is adjacent to the side of said valve and whose axis is below the cylinders and which rotates between their axes, and a ball and socket joint drive connection of spherical surface contact, from said gear to said valve, extending inwardly from the valve wall.

69. In an internal combustion engine, a pair of adjacent cylinders, a sleeve valve operable to oscillate and reciprocate within one of said cylinders, a gear which is adjacent to the side of said valve and whose axis is below the cylinders and which rotates between their axes, and a drive connection to said valve from said gear extending inwardly from the valve wall.

70. In an internal combustion engine, a pair of adjacent cylinders, a sleeve valve operable to oscillate and reciprocate within each of said cylinders, a gear which is between the sides of said valves and whose axis is below the cylinders and which rotates between their axes, and drive connections, one to each adjacent said valve from said gear, extending inwardly from the valve wall.

71. In an internal combustion engine, a pair of adjacent cylinders, a sleeve valve operable to oscillate and reciprocate within one of said cylinders, a gear which is adjacent to the side of said valve and whose axis is below the cylinders and which rotates between their axes, said gear having a bearing on the periphery of its teeth, and a ball and socket joint drive connection of spherical surface contact, to said valve from said gear, extending inwardly from the valve wall.

72. In an internal combustion engine, a pair of adjacent cylinders, a sleeve valve operable to oscillate and reciprocate within each of said cylinders, a gear which is between the sides of said valves and whose axis is below the cylinders and which rotates between their axes, said gear having a bearing on the periphery of its teeth and a drive connection to each of the adjacent said valves from said gear.

73. In an internal combustion engine two adjacent cylinders, one of them having inlet and exhaust ports through the wall thereof against which a sleeve-valve moves with cylindrical surface contact and reciprocates and oscillates with a combined motion, port means in said sleeve-valve wall adapted to cooperate with the ports of said cylinder, a rotary member between the axes of said cylinders, a connection from the rotary member to the sleeve-valve, said connection extending inwardly from the valve wall.

74. In an internal combustion engine two adjacent cylinders, one of them having inlet and exhaust ports through the wall thereof, a sleeve-valve movable against said wall with cylindrical surface contact and reciprocating and oscillating with a combined motion, port means in said sleeve-valve wall adapted to cooperate with the ports of said cylinder, a gear between the axes of said cylinders, and a drive connection from said gear to the sleeve-valve, said connection extending inwardly from the valve wall.

75. In an internal combustion engine, two adjacent cylinders, a ported sleeve valve operable in one of them, the ports of said valve co-acting with those of the corresponding cylinder for the admission of the charge and escape of the exhaust, a gear between the axes of said cylinders, a drive connection from said gear to said sleeve valve, said gear being directly driven by another gear on a lay-shaft along by the side of said cylinders, and an annular bearing for the first mentioned said sleeve gear between the planes of the ends of its teeth, and positioning said sleeve gear against radial movement.

76. In an internal combustion engine, two adjacent cylinders, a ported sleeve valve operable in one of them, the ports of said valve co-acting with those of the corresponding cylinder for the admission of the charge and escape of the exhaust, a gear between the axes of said cylinders and operatively connected to said sleeve valve, said gear being directly driven by another gear on a lay-shaft adjacent to the side of said cylinders, the connection from said gear extending inwardly from the valve wall.

77. In an internal combustion engine, two adjacent cylinders, a ported sleeve valve operable in one of them, the ports of said valve co-acting with those of the cylinder for the admission of the charge and escape of the exhaust, a rotary member between the axes of said cylinders and operatively connected to said sleeve valve, the connection extending inwardly from the sleeve valve wall.

78. In an internal combustion engine, a crank case, two adjacent cylinders attached to said case, a ported sleeve valve operable in each of said cylinders, the ports of said valve co-acting with those of the corresponding cylinder for the admission of the charge and escape of the exhaust, a rotary member between the axes of said cylinders and operatively connected to said sleeve valves, a separate connection extending inwardly from each sleeve valve wall, and a bearing for said rotary member attached to the crank case.

79. In an internal combustion engine, two adjacent cylinders, a ported sleeve valve operable in one of them, the ports of said valve co-acting with those of the cylinder for the admission of the charge and escape of the exhaust, a rotary member between the axes of said cylinders and operatively connected to said sleeve valve, the connection extending inwardly from the sleeve valve wall, and a piston within said sleeve valve with a clearance in said piston's lower side for the path of the connection to the sleeve valve.

80. In an internal combustion engine, a crank case, two adjacent cylinders attached to said case, a ported sleeve valve operable in one of said cylinders, the ports of said valve co-acting with those of the corresponding cylinder for the admission of the charge and escape of the exhaust, a driving member between the axes of said cylinders and operatively connected to said sleeve valve, a part of the connection describing a circular path and extending inwardly from the sleeve wall, and a bearing for said driving member attached to the crank case.

81. In an internal combustion engine, two adjacent cylinders, a ported sleeve valve operable in one of them, the ports of said valve coacting with those of the correspondingly ported cylinder for the admission of the charge and escape of the exhaust, a gear between the axes of said cylinders, an annular bearing for said gear between the planes of the ends of its teeth, a drive connection from said gear to the sleeve valve, a lay shaft extending along by the side of said cylinders, and a second gear upon said lay shaft directly driving the first mentioned gear, whereby said valve is actuated to move any point thereon in a smooth closed curve.

82. In an internal combustion engine, two adjacent cylinders, one of which has two adjacent intake ports and an exhaust port, a sleeve valve with coacting corresponding ports operable in said ported cylinder controlling admission of the charge and escape of the exhaust, a rotary member between the axes of said cylinders, drive means connecting said rotary member to said sleeve valve to move any point thereon in a smooth closed curve having a circumferential extent exceeding its extent parallel to the sleeve valve axis, the paths of the adjacent intake ports of said valve intersecting each other.

83. In an internal combustion engine, a cylinder and a sleeve valve operable within the cylinder, a rotary member adjacent to the side of the sleeve valve, a crank pin carried by said rotary member, a drive connection from the crank pin to the sleeve valve, adapting said pin to slide and rotate the sleeve valve, so as to move any point thereof through a smooth closed curve, said connection being formed inwardly from the wall of the sleeve valve.

84. In an internal combustion engine, a crank case, a cylinder block attached to said crank case and formed with two adjacent cylinders, said cylinder block and crank-case being formed with abutting flanges, a sleeve valve operable within each of said cylinders, a gear between the axes of said cylinders, a gear cage in which said gear is rotatably supported on its teeth, a housing for said gear cage, means for operating said sleeve valves from said gear, and a second gear directly driving the first mentioned gear.

85. In an internal combustion engine, the combination with a pair of adjacent cylinders having their axes parallel, of a sleeve valve operable within one of said cylinders, a piston reciprocable within said valve, a gear between the cylinders' axes and rotating through the plane of their axes, a crank pin carried on the side of said gear, a ball and socket joint, the socket of which is carried on the valve wall and extends inwardly thereof for operating said valve, said pin sliding through the ball of said joint, said piston having an opening in its lower portion to clear the path of said socket, and a second gear directly driving the first mentioned gear.

86. In an internal combustion engine, a ported cylinder, a cooperating ported sleeve valve for admission of the charge and escape of the exhaust operable in said cylinder, any point on said valve moving in a smooth closed curve, a driver moving around a circular path and adjacent to the side of said valve, a universal joint connection from said driver to said valve extending inwardly from the wall of the valve, said cylinder's exhaust port ends and intake port ends being curves derived from the motion of the valve, each port respectively having its ends connected by two sides to enclose said port, a substantial part of the closing side of the exhaust port being substantially circumferential to the cylinder, and a substantial part of the opening side of the intake port being substantially parallel to the axis of said cylinder.

87. In an internal combustion engine, two adjacent ported cylinders, a ported sleeve valve operable in each of said cylinders, the ports of said valve coacting with those of the corresponding cylinder for admission of the charge and escape of the exhaust, a rotary member between the axes of said cylinders, drive connections to said sleeve valves from said rotary members, comprising a member extending inwardly from each sleeve valve, and a bearing for said rotary member.

88. In an internal combustion engine, two adjacent ported cylinders, a ported sleeve valve operable in one of said cylinders, the ports of said valve coacting with those of the corresponding cylinder for admission of the charge and escape of the exhaust, a driving member between the axes of said cylinders, a drive connection from said member to the valve, having a part extending inwardly from the valve wall and describing a circular path, and a bearing for said driving member.

89. In an internal combustion engine, a crank-case, two adjacent ported cylinders, attached to said crank-case, a ported sleeve valve in one of said cylinders, drive mechanism extending between the axes of the cylinders, a drive connection from said mechanism to the sleeve valve, extending inwardly from the wall of said valve, said connection having a part moving in a circle and imparting motion to a point on said valve in a smooth, closed curve, to control the ports, and an annular bearing on the crank-case for the driving mechanism, comprising a semi-circular cap.

90. In an internal combustion engine, two adjacent ported cylinders, a ported sleeve valve engaging the ported wall of one of said cylinders and controlling admission of the charge and escape of the exhaust, a rotary member between the axes of said cylinders, a drive connection from said rotary member to the valve comprising a joint of all surface contact, carried by the wall of said valve and inwardly extending from said wall.

91. An internal combustion engine as set forth in claim 90, said rotary member being a gear.

92. In an internal combustion engine, two adjacent ported cylinders, a ported sleeve valve operable in one of said cylinders, a rotary member between the axes of said cylinders, a drive connection from said rotary member to the sleeve valve comprising a ball and socket joint, the socket thereof being mounted on said valve and extending inwardly thereof, and including a bottom closure cap having interrupted threads for assembly to the main socket member, to allow entry of the ball member.

93. In an internal combustion engine, a ported cylinder, a sleeve valve operable therein for controlling admission of the charge and escape of the exhaust, a drive connection to said valve member comprising an element carried by the valve member and inwardly extending from the wall thereof, the cylinder being formed with a plurality of intake ports spaced circumferentially of the cylinder, and with an exhaust port spaced longitudinally of the cylinder from said intake ports.

94. In an internal combustion engine, two adjacent ported cylinders, a ported sleeve valve operable in one of them, two lay shafts, one adjacent to each side of the cylinders, cranks on said lay shafts and a connecting link mounted on said cranks and extending between the axes of said cylinders, and a drive connection from said link to the sleeve valve, extending inwardly from the valve wall.

95. In an internal combustion engine, two adjacent ported cylinders, a ported sleeve valve operable in one of them, for the escape of the exhaust and admission of the charge, a lay shaft adjacent to the side of said cylinders, a crank on said shaft, a link operatively connected to said crank and extending between the axes of said cylinders, drive means from said link to said valve having a joint center inwardly from the inner surface of the sleeve valve wall.

96. In an internal combustion engine, two adjacent ported cylinders, a ported sleeve valve operable in one of said cylinders for the escape of the exhaust and admission of the charge, a rotary member between the axes of the cylinders, and operable connecting means from the rotary member to said valve to move a point on the wall thereof through a smooth closed curve generated on the corresponding cylinder wall, one of said ports in said cylinder wall being substantially within such a curve, substantial parts of the opening and closing sides being substantially parallel to a circumference of said cylinder, and the end parts of said port being curved and derived from parts of said closed curve, and a sleeve valve cooperating port to suit said cylinder port.

97. In an internal combustion engine, two adjacent ported cylinders, a ported sleeve valve operable in one of said cylinders for the escape of the exhaust and admission of the charge, a rotary member between the axes of the cylinders, and operable connecting means from the rotary member to said valve to move a point on the wall thereof through a smooth closed curve generated on the corresponding cylinder wall, one of said ports in said cylinder wall being substantially within such a curve, substantial parts of the opening and closing sides being substantially parallel to the axis of said cylinder, and the end parts of said port being curved and derived from parts of said closed curve and a sleeve valve cooperating port to suit said cylinder port.

98. In an internal combustion engine, a crank case, two adjacent ported cylinders attached to said crank case, a ported sleeve valve operable in one of said cylinders, controlling admission of the charge and escape of the exhaust, a gear between the axes of said cylinders, a drive connection from said gear to said valve, a housing, a cage positioned in said housing, receiving said gear and affording a bearing therefor, between the end planes of the gear teeth, and a second gear directly driving the first mentioned gear.

FRANK ABNER WILLIAMS.